United States Patent
Bickford et al.

(10) Patent No.: US 7,254,820 B2
(45) Date of Patent: Aug. 7, 2007

(54) ELECTROSTATIC DISCHARGE DEVICE AND METHOD FOR MEDIA DEVICES

(75) Inventors: Brian L. Bickford, Kokomo, IN (US);
Dwight A. Howard, Carmel, IN (US);
David J. Clute, Cicero, IN (US); Brian R. Newlon, Russiaville, IN (US)

(73) Assignee: Delphi Technologies, Inc., Troy, MI (US)

( * ) Notice: Subject to any disclaimer, the term of this patent is extended or adjusted under 35 U.S.C. 154(b) by 381 days.

(21) Appl. No.: 11/053,521

(22) Filed: Feb. 8, 2005

(65) Prior Publication Data
US 2006/0179446 A1    Aug. 10, 2006

(51) Int. Cl.
*G11B 7/085* (2006.01)
(52) U.S. Cl. .................................. 720/650
(58) Field of Classification Search ............ 720/650
See application file for complete search history.

(56) References Cited

U.S. PATENT DOCUMENTS 4,847,711 A * 7/1989 Inoue ..................... 360/96.5
6,590,848 B1 * 7/2003 Chen ....................... 720/654
2002/0044515 A1 * 4/2002 Aizawa et al. ............ 369/75.1

FOREIGN PATENT DOCUMENTS

JP           05198069      * 8/1993

\* cited by examiner

*Primary Examiner*—Allen Cao
(74) *Attorney, Agent, or Firm*—Jimmy L. Funke

(57) ABSTRACT

A player for a media unit. The player includes a front plate formed of metal and having an opening configured to receive a media unit. The player also includes a cover mounted over the opening and having a slit. The slit is aligned with the opening and configured to allow the media unit to pass through the cover and enter the opening. The cover includes an electrical conductor that contacts the front plate and is in electrostatic communication with the slit. The conductor conducts electrostatic charge from the media unit to the front plate as the media unit passes through the slit. The media unit may be a CD, DVD, memory stick, minidisc or the like.

20 Claims, 5 Drawing Sheets

ELECTROSTATIC DISCHARGE DEVICE AND METHOD FOR MEDIA DEVICES

BACKGROUND OF THE INVENTION

1. Field of the Invention

The present invention relates to media devices having electronic components such as a CD player, DVD player, MP3 player, or other components.

2. Description of the Related Art

Static electricity (electrostatics) is created when two objects having unbalanced charges touch one another causing the unbalanced charge to transfer between the two objects. This phenomenon commonly occurs in homes, vehicles and other environments when the air is dry. For instance, when a person slides into a car seat, electrons may transfer between the two causing the surface of the body to store a charge. When the person, then, touches a vehicle component, the charge may travel (discharge) from the body to the component thus creating static electricity. If the object touched is an electronic device, such as a home stereo, home theatre system, computer, vehicle entertainment system or other electronic media system, this electrostatic discharge can be harmful to the sensitive electronic components of the device. For instance, when a person slides into a vehicle seat and inserts a disc into the car stereo, a charge may travel from the body through the disc to the sensitive electronic components in the vehicle stereo. Similar problems may occur when using DVD and other disc players.

Accordingly, problems with the drainage of a static electric charge impacting sensitive electronic components continue to persist.

SUMMARY OF THE INVENTION

The present invention relates to an electrical conductor for a media device for draining electrostatic charge from an object entering the media device. In one embodiment, the media device is a player for a media unit. The player includes a front plate formed of metal and having a media unit receiving opening configured to receive a media unit. The player also includes a cover mounted over the opening and having a slit. The slit is aligned with the opening and configured to allow the media unit to pass through the cover and enter the opening. The cover includes an electrical conductor that contacts the front plate and is in close proximity to the media unit when the unit passes through the opening. The conductor conducts electrostatic charge from the media unit to the front plate as the media unit passes through the slit. The electrical conductor provides a low impedance electrical path from the media unit to chassis ground.

In another form, the media device is a media system for playing or accessing a memory storage unit. The system includes a player adapted to play a unit. The player includes a front plate, which is formed of metal and has an opening. The opening is configured to receive the unit. A dust cover is mounted over the opening and has a slit. The slit is aligned with the opening and configured to allow the unit to pass through the dust cover and enter the opening. An electrical conductor contacts the front plate and is in close proximity to the unit when the unit passes through the opening. The conductor conducts electrostatic charge from the unit to the front plate as the unit passes through the slit. The electrical conductor provides a low impedance electrical path from the media unit to chassis ground.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Figure 1:
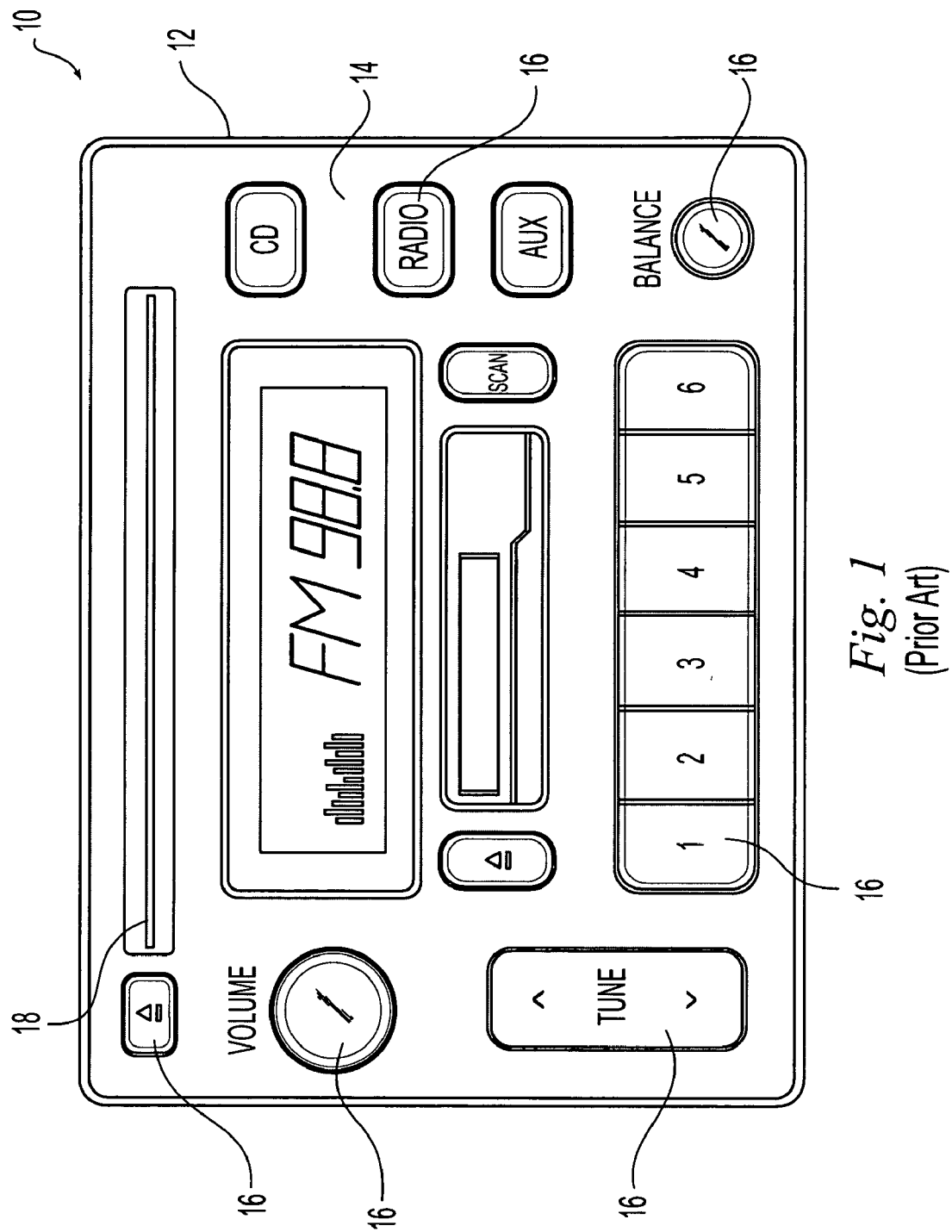
FIG. 1 is a front view of a media player according to the prior art.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Referring first to FIG. 1, the typical media player, such as vehicle/car stereo 10, includes housing 12, which is mounted to the vehicle chassis (not shown) and encloses the working components of stereo 10. The working components may include a CD (compact disc) player, DVD (digital video disc) player, radio, cassette player or other media communication device. Car stereo 10 further includes face plate 14 mounted on the front of housing 12. Face plate 14 includes, or is configured to cooperate with, one or more control buttons, knobs, touch screens and the like 16 which enable the user to control the performance and output features of stereo 10. Face plate 14 typically includes or is associated with a circuit board (not shown) that operably couples control buttons 16 to the working components. Such performance and output features may include volume, channel tuning, speaker balance, stereo mode (i.e. CD, radio, or auxiliary) and eject. Front plate 14 includes disc receiving slot 18, which is adapted to receive a media disc, such as a CD, DVD, or minidisc.

Figure 2:
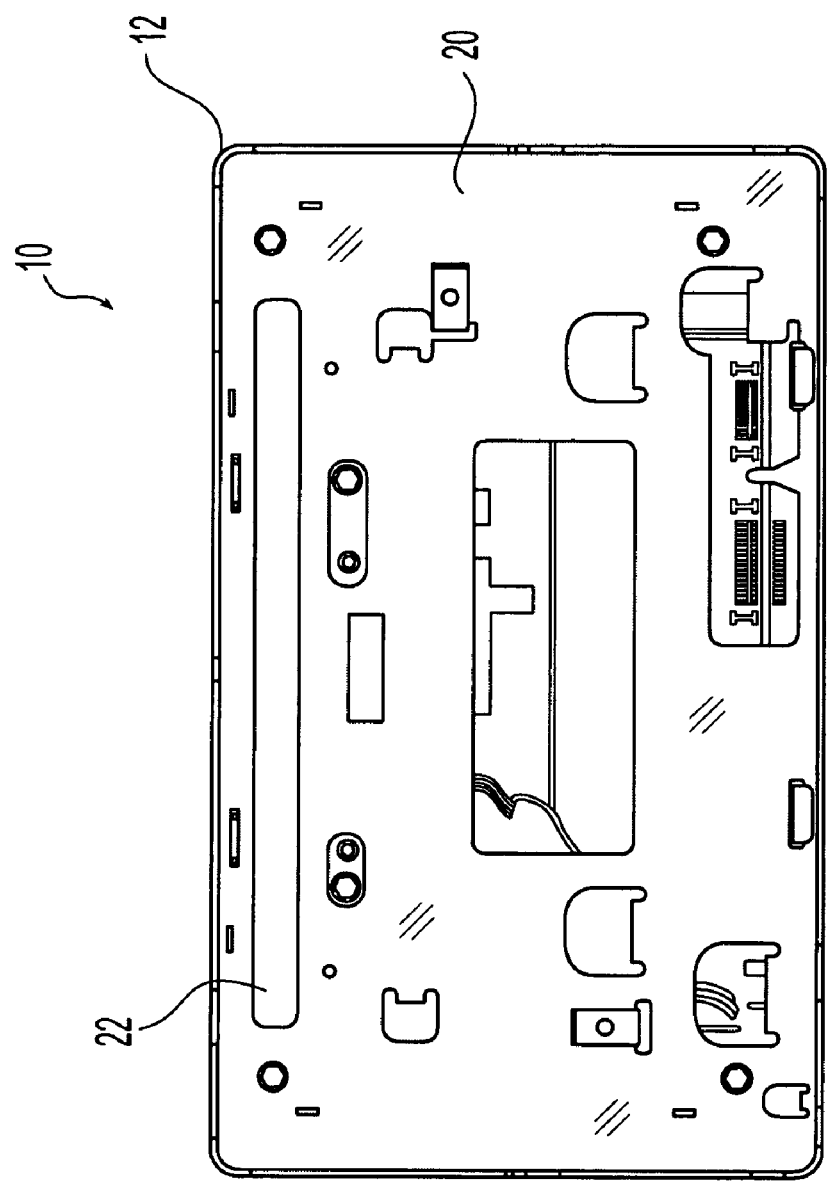
FIG. 2 is a front view of the media player of FIG. 1 wherein the face plate and dust cover are removed.
Figure 3:
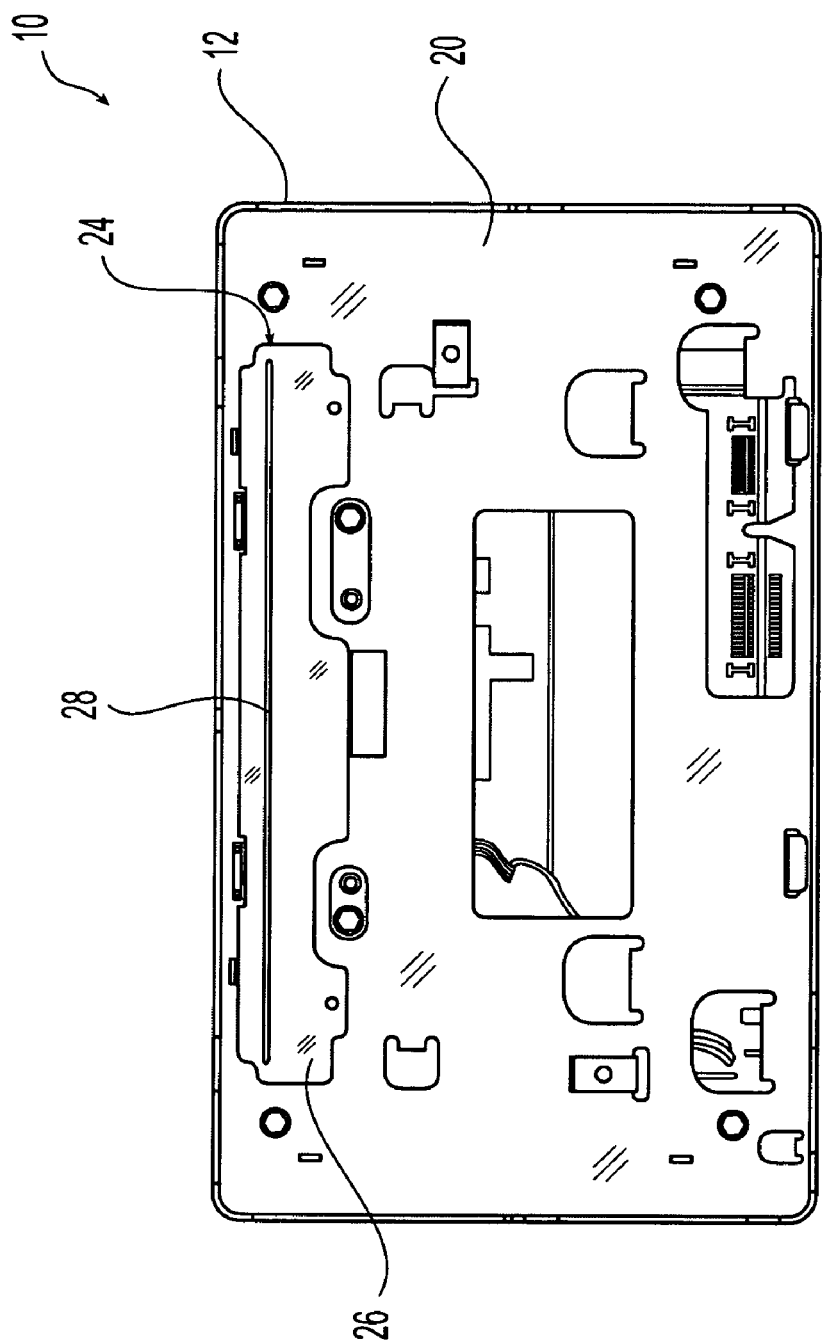
FIG. 3 is a front view of the media player of FIG. 1 wherein the face plate is removed and the dust cover is installed.

Referring now to FIGS. 2 and 3, stereo 10 is illustrated with both face plate 14 (FIG. 1) and control buttons 16 (FIG. 1) removed. Housing 12 includes front plate 20. Housing 12, including front plate 20, is commonly formed of a conductive metal such as steel and is attached to the vehicle. As shown in FIG. 2, front plate 20 includes disc receiving opening 22 which is in communication and cooperation with the disc player enclosed in housing 12. Disc receiving opening 22 is aligned with disc receiving slot 18 of face plate 14 (FIG. 1) when face plate is installed on front plate 20. Disc receiving opening 22, and disc receiving slot 18 (FIG. 1) are sized and adapted to receive a disc and move the disc to the disc player stored in housing 12.

Figure 4:
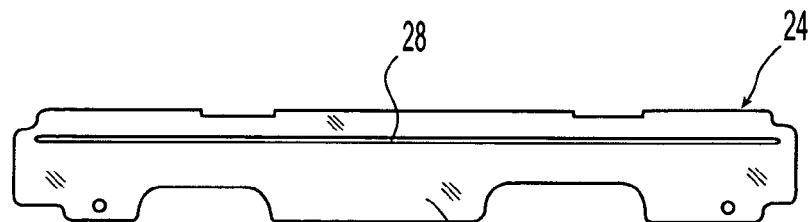
FIG. 4 is a front view of the dust cover of the media player of FIG. 3.

Turning now to FIGS. 3 and 4, dust cover 24 is mounted on front plate 20 and positioned over disc receiving opening 22 (FIG. 2). Dust cover 24 includes body 26 and disc receiving slit 28. Disc receiving slit 28 is aligned with both disc receiving opening 22 of front plate 20 (FIG. 2) and disc receiving slot 18 of face plate 14 (FIG. 1). Disc receiving slit 28 is configured to allow a disc to pass through cover 24. Slit 28 remains substantially closed when no disc is passing through, thereby preventing dust from entering the components within housing 12. Dust cover 24 is typically formed of a soft, flexible material such as felt, that will not scratch the disc as it passes through slit 28. When a disc passes through dust cover 24, the felt material defining slit 28 glides along the surfaces of the CD, thereby wiping dust from the CD and preventing dust from entering the components within housing 12.

Figure 5:
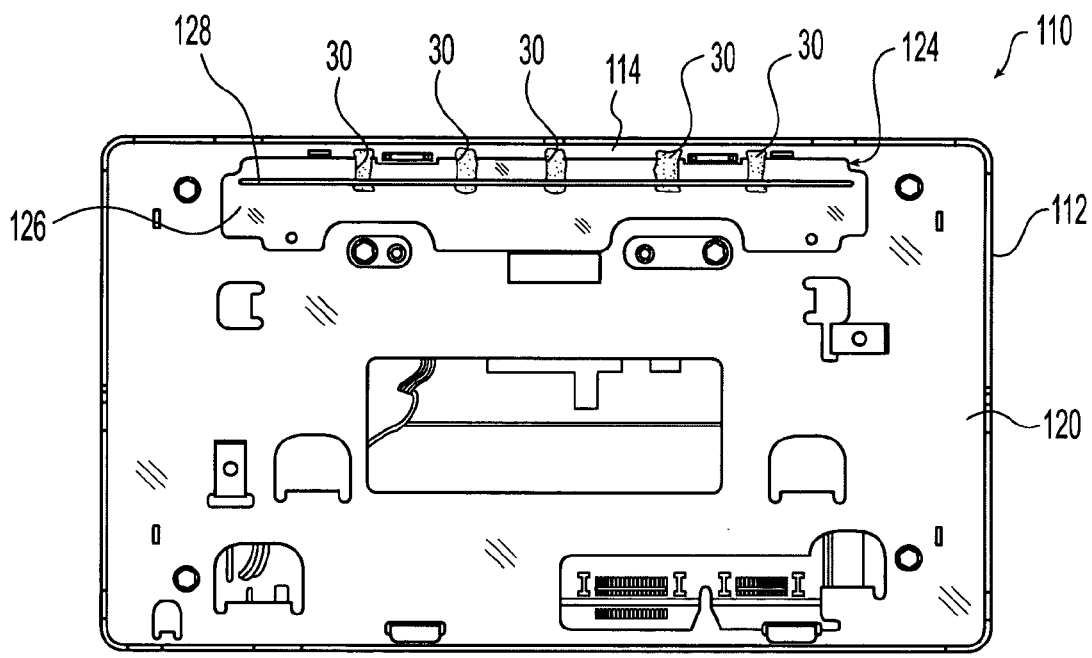
FIG. 5 is a front view of a media player according to one embodiment of the present invention wherein the face plate is removed.

Referring now to FIG. 5, car stereo 110 according to one embodiment of the present invention includes electrical conductor 30. Electrical conductor 30 includes one or more spots of conductive material or coating applied to body 126 of dust cover 124. Electrical conductor spots are positioned near disc receiving slit 128 and extend to contact front plate 120 of housing 112. The conductive material may be any material that is capable of conducting static electricity, including metallic paint or metallic tape. For instance, electrical conductor spots 30 may be formed of copper paint, or other conductive adhesive, conductive sealants, and/or conductive greases. Conductor spots 30 may have any shape or size. For instance, conductor spots 30 may be in the form of multiple round dots of conductive material spaced-apart along disc receiving slit 128. Conductor spots 30 may be in the form of an elongated strip of conductive material extending along the edge of disc receiving slit 128.

As the disc passes through disc receiving slit 128, conductor spots 30 conduct static electricity from the disc to metal front plate 120, thereby substantially draining the potentially harmful static electricity from the disc before the disc reaches the media components in housing 112. In other words, electrical conductor 30 provides a low impedance electrical path from the disc to chassis ground.

Figure 5A:
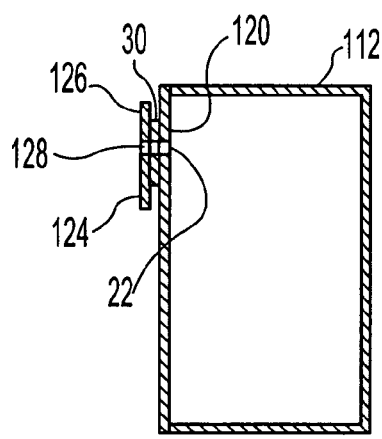
FIG. 5A is a sectional view of a media player according to another embodiment of the present invention.

In an alternative embodiment shown in FIG. 5A, conductor spot 30 is positioned between body 126 of dust cover 124.

Figure 6:
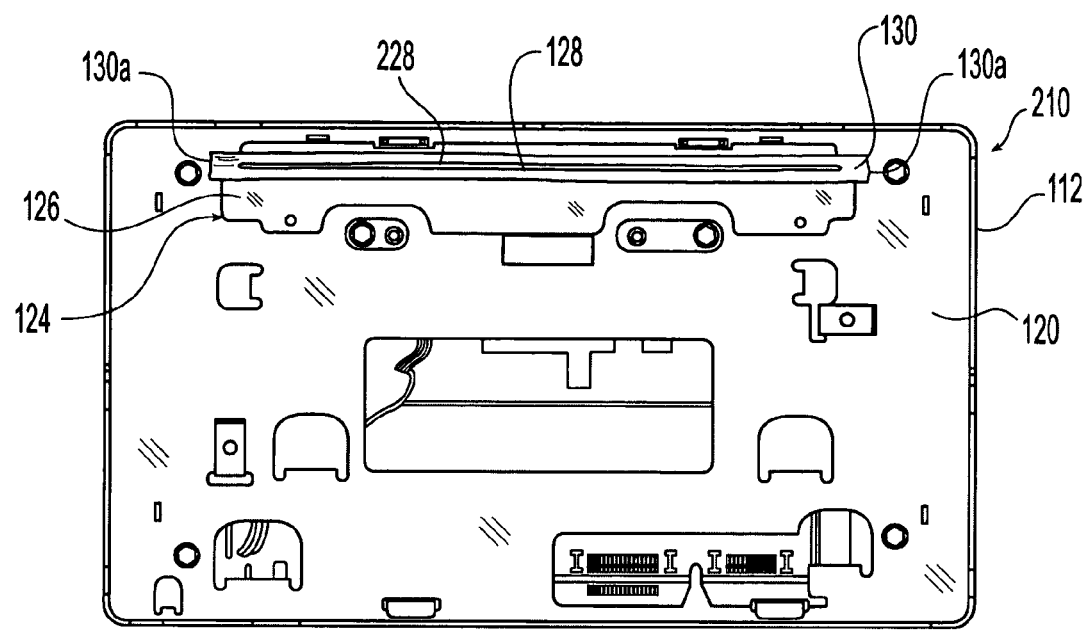
FIG. 6 is a front view of a media player according to another embodiment of the present invention wherein the face plate is removed.

FIG. 6 illustrates car stereo 210 according to another embodiment of the present invention. Car stereo 210 includes electrical conductor 130 in the form of an elongated strip of conductive material extending over disc receiving slit 128 of dust cover 124. Elongated conductor strip 130 may be attached to any part of car stereo 210, for example, front plate 120 or dust cover 124. Ends 130a of elongated conductor strip 130 contact front plate 120. Elongated conductor strip 130 includes disc receiving slot 228 which is aligned with disc receiving slit 128 of dust cover 124 and is configured to allow a disc to pass through. Conductor 130 provides a low impedance electrical path from the disc to chassis ground.

Figure 7:
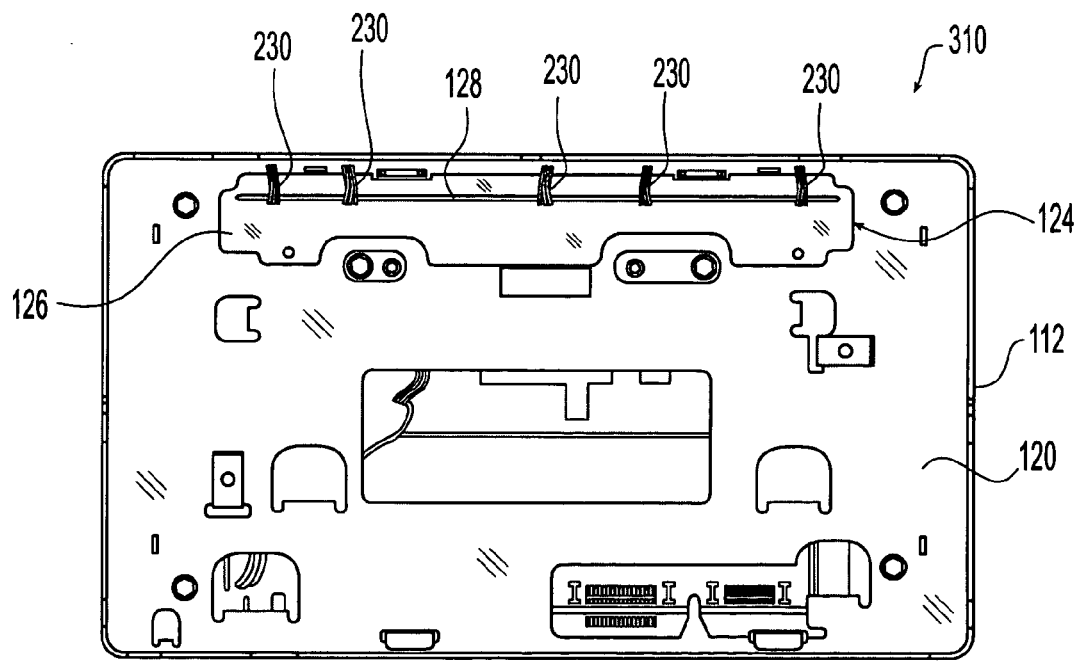
FIG. 7 is a front view of a media player according to yet another embodiment of the present invention wherein the face plate is removed.

FIG. 7 illustrates car stereo 310 according to yet another embodiment of the present invention. Car stereo 310 includes electrical conductor 230 in the form of metallic fibers, bristles or brushes affixed to car stereo 310 and extending over or near disc receiving slit 128. Electrical conductor fibers 230 extend to contact front plate 120 of housing 112. Conductor fibers 230 may be formed of or coated with any conductive material such as copper, or other conductive adhesive, conductive sealants and/or conductive greases. As the disc passes through disc receiving slit 128, conductor fibers 230 conduct static electricity from the disc to metal front plate 120. In other words, conductor fibers 230 provide a low impedance electrical path from the disc to chassis ground. It is not necessary for conductor bristles 230 to make contact with the disc to drain the static electricity from the disc. Conductor bristles need only be positioned near the disc as it passes through receiving slit 128.

Alternatively, body 126 of dust cover 124, itself, may be composed of or coated with a conductive material such that body 126 serves as an electrical conductor. For instance, conductive fibers may be woven in with the felt material or the felt material may be coated with a metallic coating.

The present invention also contemplates that the dust cover could be an integral part of, that is formed as one piece with, the front plate. In this case, the face plate may be grounded to the front plate. In another alternative, the dust cover may be an extension of a circuit board that is grounded to the front plate. Finally, the dust cover could be electrically connected to a circuit board which, in turn, is grounded to the front plate.

Although the illustrated embodiments show a car stereo, it is contemplated that the concept of the present invention may be incorporated into other media devices such as stereos, cameras, theatre systems, portable entertainment systems, computer systems and other like devices used in homes, vehicles, commercial structures or other environments. In addition, the concept of the present invention may be incorporated into systems that use or receive memory units other than discs including for example, a memory stick for an MP3 player or camera, or a credit card or smart card.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A player for a media unit comprising:
   a front plate formed of metal and having a media unit receiving opening configured to receive a media unit; and
   a cover mounted over said media unit receiving opening and having a media unit receiving slit, said media unit receiving slit aligned with said media unit receiving opening and configured to allow the media unit to pass through said cover and enter said media unit receiving opening, said cover including an electrical conductor, said conductor contacting said front plate and in electrostatic communication with said media unit receiving slit, said conductor conducting electrostatic charge from the media unit to said front plate as the media unit passes through said media unit receiving slit.

2. The media unit player of claim 1 wherein said conductor comprises a spot of conductive coating, said spot disposed proximal said media unit receiving slit and extending to said front plate.

3. The media unit player of claim 2 wherein said conductor comprises a plurality of said spots of conductive coating.

4. The media unit player of claim 2 wherein said conductive coating is a metallic paint.

5. The media unit player of claim 1 wherein said conductor comprises conductive fibers, said fibers disposed proximal said media unit receiving slit.

6. The media unit player of claim 1 wherein said dust cover is defined by a body, said conductor comprises said body, said body is formed of an electrically conductive material.

7. The media unit player of claim 1 wherein said conductor comprises an elongated conductive strip extending over said media unit receiving slit and contacting said front plate, said elongated conductive strip defining a media unit receiving slot aligned with said media unit receiving slit.

8. A media system for playing or accessing a memory storage unit comprising:
 a player adapted to play a unit, said player including a front plate formed of metal and having an opening for receiving the unit;
 a dust cover positioned over said opening and having a slit, said slit aligned with said opening and configured to allow the unit to pass through said dust cover and enter said opening; and
 an electrical conductor, said conductor contacting said front plate and in electrostatic communication with said slit, said conductor conducting electrostatic charge from said unit to said front plate as said unit passes through said slit.

9. The media system of claim 8 wherein said conductor comprises at least one spot of conductive coating, said at least one spot disposed on said dust cover proximal said slit and extending to contact said front plate.

10. The media system of claim 9 wherein said conductive coating is a metallic paint.

11. The media system of claim 10 wherein said metallic paint is a copper paint.

12. The media system of claim 8 wherein said conductor comprises a conductive brush, said conductive brush attached to said dust cover and including a plurality of conductive fibers.

13. The media system of claim 8 wherein said conductor comprises a conductive strip mounted on said dust cover proximal said slit.

14. The media system of claim 8 wherein said player is a compact disc player and said unit is a compact disc.

15. The media system of claim 8 wherein said player is a DVD player and said unit is a DVD.

16. The media system of claim 13 wherein said conductive strip is mounted over said slit and has a slot aligned with the said slit.

17. The media system of claim 8 wherein said dust cover is integrally formed as a single piece with said front plate.

18. The media system of claim 8 further comprising a face plate mounted over said front plate, said dust cover being integrally formed as a single piece with said front plate.

19. The media system of claim 8 further comprising a face plate mounted over said front plate and a circuit board grounded to said face plate, said dust cover extending from said circuit board.

20. The media system of claim 8 further comprising a face plate mounted over said front plate and a circuit board grounded to said face plate, said dust cover being electrically connected to said circuit board.

* * * * *